US010824792B2

(12) United States Patent
Soundararajan et al.

(10) Patent No.: US 10,824,792 B2
(45) Date of Patent: *Nov. 3, 2020

(54) SYSTEMS AND METHODS FOR PROVIDING CALL CONTEXT TO CONTENT PROVIDERS

(71) Applicant: Google LLC, Mountain View, CA (US)

(72) Inventors: Varun Soundararajan, Sunnyvale, CA (US); Amit Agarwal, Sunnyvale, CA (US); Sriram Bhargav Karnati, Fremont, CA (US)

(73) Assignee: Google LLC, Mountain View, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/985,383

(22) Filed: May 21, 2018

(65) Prior Publication Data

US 2018/0267941 A1 Sep. 20, 2018

Related U.S. Application Data

(63) Continuation of application No. 14/799,079, filed on Jul. 14, 2015, now Pat. No. 9,984,049.

(51) Int. Cl.
*G06F 40/14* (2020.01)
*G06F 16/23* (2019.01)
(Continued)

(52) U.S. Cl.
CPC .......... *G06F 40/14* (2020.01); *G06F 3/04842* (2013.01); *G06F 16/2322* (2019.01);
(Continued)

(58) Field of Classification Search
CPC ........... G06F 17/30864; G06F 3/04886; G06F 3/04883; G06F 3/0481; G06F 30/02; H04M 1/72561; G09G 5/00
See application file for complete search history.

(56) References Cited

U.S. PATENT DOCUMENTS 5,757,904 A 5/1998 Anderson
6,633,633 B1 10/2003 Bedingfield
(Continued)

OTHER PUBLICATIONS

AdWords Help Track Calls to a Google forwarding Number on a Website, Jul. 6, 2015, 4 Pages https://support.google.com/adwords/answer/6095883?hl=en.
(Continued)

*Primary Examiner* — Quoc A Tran
(74) *Attorney, Agent, or Firm* — Foley & Lardner LLP

(57) ABSTRACT

The present disclosure is directed to providing call context to content providers. A tracker receives a selection of a content item associated with a keyword. The tracker stores, in an impression data structure, tracking data including the keyword. The tracker maps the selected content item to a first virtual number and generates a link there between. The tracker receives a call from a client device to initiate a first communication channel via the first virtual number. The tracker performs a lookup in a database using the first virtual number to identify a second virtual number corresponding to the content provider and to identify the tracking data. The tracker establishes, via the second virtual number, a second communication channel between the client device and a content provider device. The tracker provides the tracking data to the content provider via the second communication channel.

20 Claims, 4 Drawing Sheets

(51) Int. Cl.

| | |
|---|---|
| *G06Q 30/02* | (2012.01) |
| *G06F 40/205* | (2020.01) |
| *G06F 3/0484* | (2013.01) |
| *H04L 29/08* | (2006.01) |
| *G06F 3/0488* | (2013.01) |
| *G06F 3/0481* | (2013.01) |
| *G09G 5/00* | (2006.01) |
| *H04M 1/725* | (2006.01) |
| *G06F 16/951* | (2019.01) |
| *G06F 16/957* | (2019.01) |
| *G06F 17/00* | (2019.01) |

(52) U.S. Cl.
CPC ....... *G06F 40/205* (2020.01); *G06Q 30/0242* (2013.01); *H04L 67/22* (2013.01); *G06F 3/0481* (2013.01); *G06F 3/04883* (2013.01); *G06F 3/04886* (2013.01); *G06F 16/951* (2019.01); *G06F 16/9577* (2019.01); *G09G 5/00* (2013.01); *H04M 1/72561* (2013.01)

(56) References Cited

U.S. PATENT DOCUMENTS

| | | | |
|---|---|---|---|
| 7,072,457 | B2 | 7/2006 | Brown et al. |
| 7,110,514 | B2 | 9/2006 | Brown et al. |
| 7,899,173 | B2 | 3/2011 | Ahn et al. |
| 8,144,850 | B2 | 3/2012 | Brown et al. |
| 8,320,944 | B1 * | 11/2012 | Gibson .................. H04W 4/12 |
| | | | 455/466 |
| 8,557,016 | B2 | 10/2013 | Du et al. |
| 8,577,016 | B1 | 11/2013 | Duva et al. |
| 8,781,094 | B2 | 7/2014 | Ramanathan et al. |
| 8,923,505 | B2 | 12/2014 | Mergen |
| 2007/0036284 | A1 | 2/2007 | Raghav et al. |
| 2012/0079099 | A1 | 3/2012 | Dhara et al. |
| 2012/0177189 | A1 * | 7/2012 | Chatterjee ........... H04M 3/4878 |
| | | | 379/93.17 |
| 2014/0074596 | A1 | 3/2014 | Kolluri et al. |
| 2015/0066633 | A1 | 3/2015 | Agrawal et al. |

OTHER PUBLICATIONS

International Search Report and The Written Opinion of the International Searching Authority for PCT/US2016/041740 dated Oct. 4 2016, 12 pages.

Miranda Miller, Wordstream "Adwords Now Lets You Measure Website Call Conversions" Aug. 19, 2014, 4 Pages http://www.wordstream.com/blog/ws/2014/08/19/website-call-conversions.

The International Search Report and The Written Opinion of the International Searching Authority for PCT Application PCT/US2016/041740 dated Oct. 4, 2016, 12 pages.

The Written Opinion of the International Searching Authority for application No. PCT/US2016/041740 dated Jan. 25, 2018.

U.S. Notice of Allowance on U.S. Appl. No. 14/799,079 dated Feb. 2, 2018.

U.S. Office Action on U.S. Appl. No. 14/799,079 dated Jun. 28, 2017.

* cited by examiner

SYSTEMS AND METHODS FOR PROVIDING CALL CONTEXT TO CONTENT PROVIDERS

CROSS-REFERENCES TO RELATED APPLICATIONS

This application claims the benefit of priority under 35 U.S.C. § 120 as a continuation of U.S. patent application Ser. No. 14/799,079, filed Jul. 14, 2015, which is hereby incorporated by reference herein in its entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is directed to providing call context to content providers via a computer network. In some implementations, a data processing system provides, for display on a user's display device, a content item such as an advertisement. When a user selects or otherwise interacts with the content item, the data processing system can assign a dynamic or virtual phone number to the content item. For example, the data processing system can access a pool of available phone numbers (or voice over internet protocol identifiers, usernames, video chat usernames, etc.) for the advertiser that provided the advertisement, select one of the phone numbers, and provide, for display with the advertisement, the selected phone number. The data processing system can receive a phone call at the virtual number. The data processing system can further perform a lookup for the virtual phone number to identify tracking data associated with the phone number. For example, the tracking data may include one or more of matching keywords, a network source, promotion, coupon, offer in the advertisement, one or more terms of or associated with a user's search query, or other information associated with the displayed content item that may facilitate providing context about the call. In some implementations, the tracking data may not include a user's search query or terms thereof. In some implementations, that data processing can tie the click to the call based on a time interval between the advertisement selection and the initiation of the call.

The data processing system, responsive to receiving the call from the user device, can initiate a call to the content provider that provided the content item and further provide the content provider with the tracking data. The data processing system can merge, bridge, transfer, conference, or otherwise connect the call made by the user to the virtual number with the call made by the data processing system to the advertiser. When receiving the call, the content provider may receive a caller identification number that may identify the virtual number dialed by the user's computing device, a number of the data processing system, or the number associated with the user's computing device.

At least one aspect is directed to a method of providing call context via a computer network. The method can be performed by one or more processors of a data processing system. In some implementations, the method includes receiving, by a tracker executed by the data processing system via the computer network, a selection of a displayed content item selected based on a keyword associated with the content item. In some implementations, a content selector executed by a processor of a data processing system may provide the content item for display with a webpage (e.g., a news webpage, blog, search engine results webpage). The data processing system can store tracking data including the keyword of the selected content item. The data processing system can store the tracking data responsive to the selection, and store the tracking data in an impression data structure. The data processing system can parse a database storing a mapping of content items to virtual numbers to map the selected content item to a first virtual number. The data processing system can parse the data base responsive to the selection. The data processing system can generate a link between the tracking data stored in the impression data structure and the first virtual number stored in the database. The data processing system can provide the first virtual number via the webpage. The data processing system can receive a call from a client device to initiate a first communication channel via the first virtual number. The data processing system can perform, responsive to the call, a lookup in the database using the first virtual number to identify a second virtual number corresponding to the content provider and to identify the tracking data linked with the first virtual number. The data processing system can establish, via the second virtual number, a second communication channel between the client device and a content provider device. The data processing system can provide the tracking data to the content provider via the second communication channel or during the second communication channel.

Another aspect is directed to a system for providing call context via a computer network. The system can include a data processing system comprising a processor. In some implementations, the system can include a content selector and a tracker executed by the data processing system. The content selector can provide a content item for display with a webpage. The content item can be selected based on a keyword associated with the content item. The tracker can receive, via the computer network, a selection of the displayed content item selected based on the keyword of the content item. The tracker can store, in an impression data structure responsive to the selection, tracking data including the keyword of the selected content item. The tracker can parse, responsive to the selection, a database storing a mapping of content items to virtual numbers to map the selected content item to a first virtual number. The tracker can generate a link between the tracking data stored in the impression data structure and the first virtual number stored in the database. The tracker can provide the first virtual number via the webpage. The tracker can receive a call from a client device to initiate a first communication channel via the first virtual number. The tracker can perform, responsive to the call, a lookup in the database using the first virtual number to identify a second virtual number corresponding to the content provider and to identify the tracking data linked with the first virtual number. The tracker can establish, via the second virtual number, a second communication channel between the client device and a content provider device. The tracker can provide the tracking data to the content provider via the second communication channel or during the second communication channel.

Yet another aspect is directed to a non-transitory computer readable medium having instructions to provide call context via a computer network. The instructions can include instructions to provide a content item for display with a webpage. The content item can be selected based on a keyword associated with the content item. The instructions can include instructions to receive, via the computer network, a selection of the content item. The instructions can include instructions to store, in an impression data structure responsive to the selection, tracking data including the keyword of the selected content item. The instructions can include instructions to parse, responsive to the selection, a database storing a mapping of content items to virtual numbers to map the selected content item to a first virtual number. The instructions can include instructions to generate a link between the tracking data stored in the impression data structure and the first virtual number stored in the database. The instructions can include instructions to provide the first virtual number via the webpage. The instructions can include instructions to receive a call from a client device to initiate a first communication channel via the first virtual number. The instructions can include instructions to perform, responsive to the call, a lookup in the database using the first virtual number to identify a second virtual number corresponding to the content provider and to identify the tracking data linked with the first virtual number. The instructions can include instructions to establish, via the second virtual number, a second communication channel between the client device and a content provider device. The instructions can include instructions to provide the tracking data to the content provider via the second communication channel or during the second communication channel.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
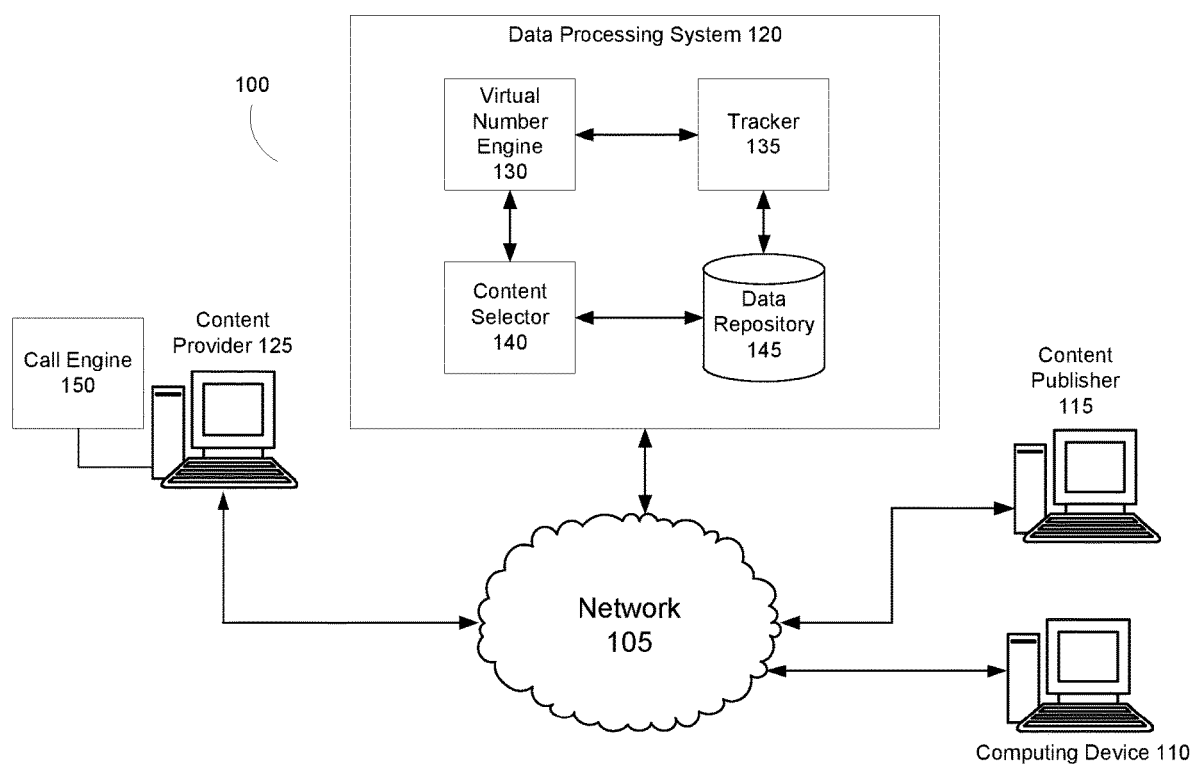
FIG. 1 is an illustration of a system to provide call context via a computer network in accordance with an implementation.

The present disclosure relates to providing call context when directing customers to customer service representatives via a communication channel such as a voice or video call. For example, content providers (e.g., advertisers) may provide content items (e.g., electronic advertisements) for display with a web page. The content item may include or be associated with a phone number or other identifier (e.g., click-to-call advertisement, or call only advertisement) that allows a user, potential customer or other viewer of the content item to contact or initiate a communication with the content provider. However, when the content provider (or a customer service representative of the content provider) receives the call, the content provider may have minimal information about the customer or context associated with the call. For example, the content provider may not have information about the content item that resulted in the call, keywords that were used to select the content item for display on the web page, one or more terms of the user's search query that matched the content item, a type of content network, or other information associated with the display of the content item and/or or the selection of the content item.

Providing this context may facilitate a content provider providing a customized user experience. For example, if the keywords "red shoes" caused the content item to be selected for display on the webpage, a landing page can be customized for red shoes instead of a generic page showing shoes of different colors. Systems and methods of the present solution can facilitate providing such context for customer service calls. In some implementations, the present solution can provide call tracking value for call advertisements when the call advertisement provides a virtual phone number.

In some implementations, a data processing system selects and provides a call content item for display with a webpage. The call content item may include an advertisement in the form of a sponsored link included by the search engine (e.g., via content selector) in the search results. The content item may include a link or button to a phone number that facilitates providing tracking data to a content provider. A user selects or clicks on a call button of the call content item, or calls the provided number. This number may be a virtual number or forwarding number provided by the data processing system. The data processing system then receives the call and identifies tracking values associated with the call and the content item. For example, the data processing system may tie the virtual number with this impression of the content item. The data processing system may then access an impression log for this content item, which may include keywords of the content item, the website the content item was displayed with, time of day, content network, search query with which the content item matched, etc.

The data processing system, after obtaining this information, can provide some or all of this information to the content provider or customer service representative that receives the call. In one implementation, the data processing system can identify a website or other site, database, electronic mail account, or file path configured by the content provider to receive the tracking values. The data processing system may provide the tracking values for display on the site. The site may be a secure site that requires authentication credentials prior to gaining access. The information may be posted on the site on a temporary basis, e.g., a time interval of 5 minutes, 15 minutes, 30 minutes, 1 hour, two hours, etc. starting with the content item impression or the customer's call to the data processing system. The tracking value may be anonymous in that it may not identify any personally identifying information.

The data processing system may initiate a call to the content provider and then bridge the two legs of the call (e.g., the customer's call to the data processing system with the data processing system's call to the content provider). The data processing system may provide the tracking values prior to calling the content provider, simultaneously with calling the content provider, or after initiating or establishing a call with the content provider.

When the content provider receives the call from the data processing system, the content provider can identify, using caller identification, the virtual number used to make the call. The content provider may then use the virtual number to lookup the site in which tracking values are posted. Thus, the customer service representative that received the call may now have additional information around the source of the call in order to provide a better and customized user experience. The caller identification may identify the virtual number dialed by the user's computing device, a number of the data processing system, or the number associated with the user's computing device. In some cases, if the virtual number is the only number from the pool of available numbers that is currently allocated, then the content provider may receive this virtual number as the caller identification.

In an illustrative implementation, the present solution can provide differentiated customer service. For example, a customer may search for a vacation package to Cancun. The data processing system may receive a search query input into a search engine for a Cancun vacation package. The data processing system may provide search results responsive to the search query. The data processing system may further select and provide a call advertisement that matches the search query for display with the search results. The call advertisement may be from an advertiser that provides travel and hotel packages to Cancun, among other destinations. The potential customer may click on or otherwise dial the number associated with the call advertisements. The call advertisement may display a virtual number for the advertiser. The call advertisement may display the virtual number responsive to receiving an indication of interest in the call advertisement (e.g., a click or selection or other interaction with the call advertisement). Prior to connecting the call to the advertiser, the data processing system can determine that the keywords that matched the advertisement were "vacation package Cancun" and provide these matched keywords to the advertiser. This may improve the user experience because the content provider may value vacation package leads more than other leads and allow them to prioritize this call higher and also assign the potential customer to a gold or higher level customer service representative who can help with the vacation package.

In another illustrative implementation of providing an improved user experience, the data processing system receives a search query input into a search engine for auto insurance. The data processing system, responsive to the search query, provides search results and further selects and provides a call advertisement for display with the search results that matches the search query. The call advertisement may display a virtual number for the advertiser. The call advertisement may display the virtual number responsive to receiving an indication of interest in the call advertisement (e.g., a click or selection or other interaction with the call advertisement). The user may call the advertiser associated with the call advertisement using the number provided via the call advertisement. Prior to the data processing system connecting the call to the advertiser, the data processing system can provide the keywords that matched the call advertisement to the advertisement. Thus, the customer representative may understand the user's needs better and provide more specific responses regarding auto insurance.

The data processing system can also provide improved leads management. For example, a content provider may receive leads from various sources, such as a paid search service, contextual content placement service, banner advertisements, social advertisement, retargeting campaigns, etc. However, the content provider may value leads provided by a source higher than leads provided by other sources. For example, the content provider may value leads provided by a paid search service higher than leads from banner advertisements. Thus, by providing the content provider with information about the source of the call, the content provider can allocate resources accordingly (e.g., assign a more experienced or higher rated customer representative to answer the call).

The data processing system can be configured to provide the tracking values to the content provider using in-band or out-of-band, push or pull techniques. With an in-band technique, the data processing system can pass the tracking value using a header of the voice communication protocol (SIP) itself. For example, the data processing system can play the tracking value to the content provider in the beginning of the call. With an out-of-band technique, the data processing system can post the tracking values to a site prior to connecting the call to the content provider and the content provider would be able to access those values via the site. With a push technique, the data processing system can push the tracking data to a content provider's device responsive to receiving or identifying the tracking data. With a pull technique, the content provider's device may contact the data processing system and request tracking data from the data processing system (e.g., based on user input, periodically, responsive to receiving a call, etc.). For example, the content provider may use a virtual number as an identifier to pull the tracking data from the data processing system.

The data processing system is configured to use virtual numbers to facilitate providing tracking data. A virtual number may refer to a telephone number without a directly associated telephone line. These numbers are programmed to forward incoming calls to one of the pre-set telephone numbers chosen by a client; either Fixed, Mobile or VoIP. A virtual number can work like a gateway between traditional calls (PSTN) and VOIP. Subscribers to virtual numbers may use their existing phones, without the need to purchase additional hardware. A virtual telephone number can be set to forward calls to different telephone numbers depending on the time of day and the day of the week.

The data processing system can be further configured to use the virtual number with a content item to track calls made to the content provider. For example, with a call extension content item or call-only content item, the virtual number (or content forwarding number) can facilitate receiving and tracking phone calls resulting from the content item. To do so, the data processing system can assign, select or otherwise provide a unique virtual number to be displayed with the content item of a content provider. When a potential customer calls this unique virtual number, the data processing system receives the call and routes the call to the corresponding content provider. The content provider may then obtain information about the calls generated by the content item. The data processing system may maintain the anonymity of the customer by providing the forwarding number as the caller identification number, rather than the customer's number. This may also allow the content provider to access the tracking data in real-time, e.g., prior to or while connecting the call, as opposed to a later time after the call is completed. Thus, the content provider can use the tracking data to improve the call experience or better select the representative to receive the call, as opposed to merely reporting purposes at some point after the call is completed.

FIG. 1 illustrates an example system 100 for providing call context via a computer network. The system 100 can include content selection infrastructure. The system 100 can include a data processing system 120 communicating with one or more of a content provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one virtual number engine 130, at least one tracker 135, at least one content selector 140, and at least one data repository 145. The virtual number engine 130, tracker 135 and content selector 140 can each include at least one processing unit or other logic device such as programmable logic array engine, or module configured to communicate with the database repository or database 145. The virtual number engine 130, tracker 135, content selector 140 and data repository 145 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine 130 of the data processing system or online marketplace. The input query may include text, characters, symbols, etc. The data processing system 120 may receive the input query from a computing device 110 via network 105. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or otherwise widgets through which a user of a client can select or otherwise indicate a category for the search.

Responsive to the search query or other request for content (e.g., electronic advertisements), the data processing system 120 (e.g., via content selector 140) can identify, select or otherwise obtain content to be provided or presented via the computing device 110 making the request, or some other computing device 110 associated with the request for content. In some implementations, the data processing system 120 may identify, select, or otherwise obtain content not responsive to receiving any request. The content may include, e.g., text, characters, symbols, images, video, audio, or multimedia content. The content may include a phone number, a virtual phone number, or a call extension. The content item may include an advertisement in the form of a sponsored link (e.g., provided by content providers) included by the search engine (e.g., via content selector) for display in the search engine results page. The content item may include a link or button to a phone number that facilitates providing tracking data to a content provider. In cases where the content item includes a virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page or a page of an online marketplace). The data processing system may initiate or utilize an online auction process to select one or more of the multiple content items for display on the online document. An auction system may determine two or more bids for content items to be displayed in an online document. The auction system can run the bids through an auction process to determine one or more winning bids. Content items corresponding to the winning bids may be selected for display on or with the online document.

The data processing system 120 may include a content selector 140. The content selector 140 may analyze, parse, or otherwise process subject matter of candidate content items to determine whether the subject matter of the candidate content items correspond to the online marketplace. The content selector 140 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector 140 may process the metadata to determine whether the subject matter of the candidate content item corresponds to the online marketplace.

Content providers may provide additional indicators when setting up a content campaign that includes content items. The content provider may provide information at the content campaign or content group level that the content selector 140 may identify by performing a lookup using information about the candidate content item. For example, the candidate content item may include a unique identifier, which may map to a content group, content campaign, or content provider. The content selector 140 may determine, based on information stored in data repository 145 about the content provider (e.g., an electronic application developer), that the candidate content item corresponds to an electronic application, or that the candidate content item is unrelated to the electronic application, but may be otherwise relevant for display on the interface.

The data processing system 120 may select the content using various techniques. For example, the data processing system 120 may select content from a referral or a lead from a partner content selection network. In some implementations, the content may not be selected using a keyword or matching technique, but be selecting based on a referral or a lead.

The data processing system 120 may include a virtual number engine 135. The virtual number engine 135 can be designed and constructed to identify a unique virtual number (e.g., unique forwarding number). The virtual number engine 135 may provide the unique virtual number for display with the selected content item being displayed with a webpage on a client computing device 110. The virtual number engine 135 may provide a link to the unique virtual number that, when selected by a user of the computing device 110, causes the computing device 110 to initiate a communications channel with the data processing system 120. For example, selecting the link provided by the virtual number engine 130 via the computing device 110 can initiate a phone call to the data processing system 120.

In some implementations, the data processing system 120 can provide the unique virtual number for display with the content item on the webpage responsive to receiving an indication of interest in the content item. For example, the data processing system 120 can display the content item on the webpage with a button, drop down menu, icon, roll-over icon, or other user interface widget. When a user interacts with the user interface widget (e.g., clicking or selecting a button), the data processing system can receive an indication of the user selection.

Responsive to receiving the indication of user selection, the data processing system 120 can identify, select, generate or otherwise assign a virtual number to the content item. The data processing system 120 may access a pool or repository of available virtual numbers. The virtual numbers may already be assigned to the content provider associated with the content item. The virtual numbers may be assigned to a content campaign or a content group that includes the content item. The virtual number may be a toll free "800" number, a charge number such as a "900" number, a local number, or a long distance number.

The data processing system may determine the virtual number to be an available virtual number if the virtual number is not currently assigned to another content item or content provider. For example, due to the limited number of virtual numbers and the costs associated with purchasing phone numbers, the virtual number engine 130 may be configured with one or more policies that facilitate reusing or recycling virtual numbers. The virtual number engine 130 may reuse a virtual number 130 if the number has not been provided for display for a time interval or duration (e.g., 2 hours, 24 hours, 72 hours, a week, 30 days, 60 days, 90 days, etc.).

Figure 3:
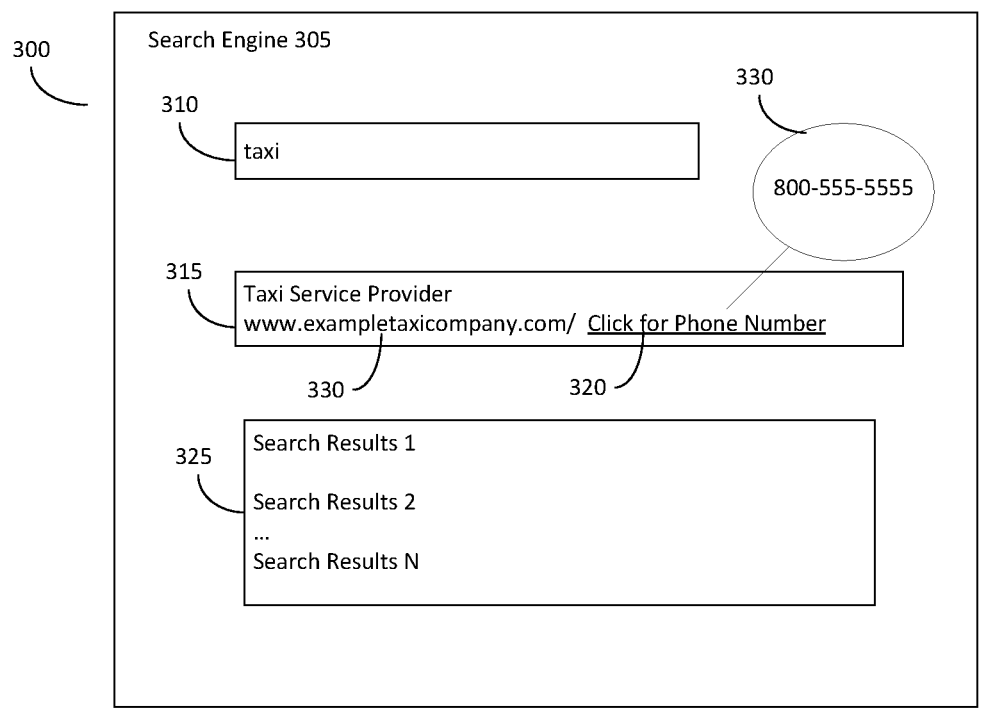
FIG. 3 is a block diagram of a user interface that facilitates providing call context via a computer network in accordance with an implementation.

FIG. 3 illustrates an example user interface of providing a content item 315 with a virtual number 320, in accordance with some implementations. The user interface includes a search engine user interface 305 or search engine results page 305. The search engine 305 includes an input text box 310 in which a user may enter a search query, such as taxi. The search engine 305 can provide search results 325 (e.g., search results 1, etc.). The search engine 305 may also receive content items (such as advertisements) 315 in response to the search query 310. In this example, the advertisements 315 may be for a taxi service provider. The taxi service provider may have setup an advertisement campaign or advertisement group that includes content selection criteria that includes the term "taxi". The advertisement may include a web link to the taxi provider's website. The advertisement 315 may further include a link 320 to access a virtual number. A user may select the link 320. Responsive to receiving the selection of the link, the data processing system (e.g., via the virtual number engine 330) may display a virtual number 330. The virtual number 330 may be displayed via a pop up window, by replacing the text 320, by directing the user to another website. In some cases, selecting the link 320 may cause the user's device to call the virtual number. For example, the data processing system 120 may receive the selection, provide the virtual number to the user's device, and instruct the user's device to further call the virtual number.

When the data processing system 120 receives a selection of the advertisement 315, link 320, or other request for a phone number corresponding to the advertisement 315, the data processing system can parse a database storing a mapping of content items to virtual numbers to map the selected content item to a first virtual number. The database may be stored in data repository 145 and include a mapping of several content items, content groups, or content campaigns to virtual numbers. The database may include mappings of content providers to virtual numbers. In some implementations, the database may dynamically assign virtual numbers, and then store, in the database, a mapping of the dynamically generated/assigned virtual number to the content provider, content campaign, content group, or content item.

The data processing system 120 may perform a lookup in the database to map the content item to the virtual number. The data processing system 120 may use a unique identifier of the content item, content campaign, content group, or content provider to perform the lookup to map the content item to the virtual number. For example, the data processing system 120 receives a selection of the phone number link 330. The selection of the phone number link 330 initiates a request for a virtual number from the data processing system 120. The request for the virtual number 120 may include information about the content item 315, such as a unique identifier of the content item or content provider. In some cases, the request may include a URL of the web page on which the content item is displayed, or the link to the target page 330, in which case the data processing system 120 may access the identified web page to map the content item to the virtual number. Thus, the data processing system 120 can use the identifier or other indicator associated with the content item 315 provided or associated with the request for the virtual number (via selection of link 320) to perform the lookup in the database to map the content item to the virtual number.

The data processing system 120 may include a tracker 135. The tracker 135 may be designed and constructed to receive, obtain, determine or otherwise identify tracking data and store the tracking data in an impression data structure. Tracking data may include information associated with a content item, selection of the content item, or an impression of the content item. For example, tracking data may include content selection criteria that were used to select the content item for display with or on a web page. Content selection criteria may include keywords, terms, phrases, geographic location, device type, etc. The tracker 135 may obtain tracking data from or via the content selector 140, a content provider 125, or a user's computing device 110. In some cases, the content selector 140 may store the tracking data in an impression log or data structure, and the tracker 135 may obtain the tracking data from the impression data structure.

The tracker 135 may be configured to obtain and store the tracking data responsive to receiving a selection from a user's computing device 110 of the content item. The selection may include a click of the content item. In some cases, the selection may refer to a selection of the phone number link (e.g., link 320). For example, the tracker 135 may not store the tracking data responsive to a selection of link 330, but the tracker 135 may store the tracking data responsive to receiving a selection of the phone number link 320 (or a request for a phone number). The data processing system 120 may be configured to distinguish between a selection of the URL 330 as compared to the selection or request for a phone number via phone number link 320, and may further store the tracking data or perform other functions related to providing call context in response to selection of the phone number link 320.

The impression data structure may be stored in data repository 145. The impression data structure may include a table format or other data format for storing, maintaining, organizing or manipulating impression records. An impression record may refer to an instance of displaying a content item or advertisement on a web page. The impression may include information about the web page on which the content item is displayed (e.g., uniform resource locator of the web page, location/position of the content slot, keywords of the web page), search query input by the user into a search engine that resulted in the content item being selected, a keyword of the content item and/or a keyword of the web page or search query that resulted in the content item being selected for display (e.g., via a broad, phrase or exact match or other relevancy or similarity metric), time stamp associated with the impression, geographic location of the computing device 110 on which the content item is displayed, type of device, etc.

The data processing system 120 may store impression records in the impression data structure on a temporary basis and remove or delete the impression records after some duration (e.g., 24 hours, 48 hours, 72 hours, 30 days, 60 days, 90 days, etc.). The data processing system 120 may remove the impression records responsive to an event, condition or trigger. For example, the data processing system 120 may delete the impression record responsive to a call associated with the impression terminating or after a time interval or duration after termination of the call associated with the impression.

The data processing system 120 (e.g., via tracker 135) can generate a link between the tracking data stored in the impression data structure and the virtual number stored in the database. The link may include a pointer or other association mechanism between the tracking data and the virtual number. In some cases, the tracker 135 may update the impression record in the impression data structure with the mapped virtual number. In some cases, generating the link may refer to the data processing system 120 generating a second data structure or data record or entry that includes the tracking data and the virtual number. For example, the tracker 135 may create a tracking link data structure that provides an entry with the tracking data that is associated with a corresponding virtual number. This data structure may further include information about the impression record or the computing device 110.

In some implementations, the link the data processing system 120 generates may be a temporary. The link may be a temporary link because the data processing system 120 may destroy, terminate or otherwise remove the link based on duration, time interval, condition, event or other trigger. The duration or time interval may be based on duration from an event. For example, the event may be the initial impression, selection of the content item, request for the virtual number, or receiving the call. For example, the data processing system 120 may remove the link between the tracking data and the virtual number after 2 hours, 4 hours, 48 hours, 72 hours, a week, 30 days, etc. of the impression, the selection of the content item, creating the link, receiving the call, etc.

In some implementations, the data processing system 120 may remove the link between the tracking data and the virtual number based on a condition. The condition may include, e.g.: receiving a request for the virtual number but not receiving a call to that number within a duration of providing the number (e.g., 2 hours, 4 hours, 48 hours, 72 hours, a week, etc.); receiving a certain number of calls to the number (e.g., 2 calls, 3 calls, 5 calls, etc.).

The data processing system 120 (e.g., via the tracker 135 or virtual number engine 130) can provide the first virtual number via the webpage. A computing device 110 may include call capabilities and may initiate a call (or other telecommunications channel) to the virtual number by dialing the number or selecting an interactive link of the number which initiates a call process of the device 110. In some implementations, a user may initiate the call to the virtual number from a device different from the device 110 on which the web page and phone number is displayed. For example, a user may view the web page with the advertisement and phone number from a desktop computer, laptop computer, or tablet, and then call the number from a land line phone or cellular phone. Since the data processing system 120 can assign the virtual number to the selection of the content item and link the virtual number with the tracking data for the content item, a user may call the virtual number from a different device and the data processing system 120 can still access the corresponding tracking data.

The data processing system 120 (e.g., via the virtual number engine 130 or tracker 135) can receive a call from a client device to initiate a first communication channel via the first virtual number. For example, the client device may dial the first virtual number to initiate the telecommunications channel and the data processing system 120 may receive an indication of initiation of the telecommunication (e.g., a ring). The data processing system 120 may perform one or more functions upon receiving the call (or indication thereof).

Responsive to receiving the call, the data processing system 120 can perform a lookup in a database using the first virtual number to identify a second number or second virtual number corresponding to the content provider and to identify the tracking data linked with the first virtual number. For example, the first virtual number may be used to call the data processing system 120 and further used to access the linked tracking data and identify the second number. The second number may be used to call the content provider (or customer service representative thereof). In some cases, the content provider may provide the second number when setting up the content campaign, and the second number may be stored in a database of the data processing system 120.

The data processing system 120 can, upon identifying the second number, use the second number to establish a second communication channel between the client device and a content provider device. The data processing system 120 may dial the second number and the content provider may receive the call. The content provider (or customer service representative) may answer the call. The data processing system 120 may merge or bridge the first call with the second call to create the second communication channel that connects the user with the customer service representative of the content provider.

The data processing system 120 may provide context for the call by providing some or all of the tracking data associated with the first virtual number to the content provider. The data processing system 120 may provide the tracking data to the content provider before creating the second communication channel, during the second communication channel, or after creating the second communication channel. The data processing system 120 can provide the tracking data to the content provider or customer service representative using various techniques including, e.g., in-band and out-of-band communications techniques.

In some implementations, the data processing system 120 provides the tracking data using an out-of-bound technique. With an out-of-band technique, the data processing system 120 can post the tracking values the content provider using a communication medium different from the second communication channel. For example, the data processing system 120 may access a data structure storing a mapping of the second number to an identifier for an electronic mail message, Simple Messaging Service number (text message), instant messaging username, an electronic site, display portal identifier, etc. The data processing system 120 may then provide the tracking data to the content provider using the identifier by, e.g., sending an electronic mail message or other communication to the content provider.

In some implementations, the data processing system 120 can perform a lookup in the database using the first virtual number to identify an electronic site associated with the content provider. For example, a content provider may identify an electronic site via a uniform resource locator that can be used to display the tracking data to a customer service representative that receives the call. The electronic site may be a secure site that can be accessed using security credentials such as a security certificate, username, password, approved source IPs, etc. The data processing system 120 may be configured with the security credentials or may access the security credentials via the lookup. In some implementations, the data processing system 120 may be preapproved or preauthorized to provide the tracking data to the electronic site. In some implementations, the data processing system 120 itself may host the electronic site in which case the data processing system 120 may provide the tracking data for display on the electronic site without going through an authentication or authorization process.

The data processing system 120 can be configured to provide the tracking values to the content provider using an in-band technique. With an in-band technique, the data processing system 120 can pass the tracking value using a header of the voice communication protocol (SIP) itself. For example, the data processing system can play the tracking data to the content provider at the beginning of the call. In some cases, the data processing system 120 can convert the tracking data text to speech and provide the tracking data in an audio format at the beginning of the call to the customer service representative. The data processing system 120 may play the audio tracking data to the customer service representative prior to connecting the user with the customer service representative. For example, the data processing system 120 can receive a first call from the user, hold the first call, identify and convert tracking data to audio, make a second call to the content provider (or customer service representative), play the audio tracking data, and then merge the first and second calls to connect the user with the customer service representative (or devices thereof).

In some implementations, the data processing system 120 may play an audio identifier that includes an identifier for an electronic site for the customer service representative to access. For example, the data processing system 120 may indicate at the beginning of the second call to the customer service representative to go to a certain electronic site (e.g., via a URL) or provide a code or identifier that the customer service representative may then input into an electronic site comprising the tracking data that may unlock the tracking data for the customer service representative to access.

In some implementations, the data processing system 120 may provide the tracking data based on time intervals, conditions or events. For example, the data processing system 120 can determine a time interval between when a user selected the content item and made the call, and provide the content item if the time interval satisfies a threshold time interval. To do this, the data processing system 120 may identify a first time stamp for the selection of the content item. The data processing system 120 may identify the time stamp by accessing the impression data structure that includes the impression record that corresponds to the virtual number. For example, when the data processing system 120 receives a call from the user via the first virtual number, the data processing system can perform a lookup in the database to determine the corresponding tracking data, which may include the time stamp of the selection of the content item. The data processing system may further identify a second time stamp for the call from the user to the data processing system to initiate the first communication channel. The second time stamp may refer to when the user made the call or when the data processing system receives the call. The data processing system may access a call log stored in data repository 145 to determine the time stamp of the call. The data processing system can determine a time interval between the first time stamp and the second time stamp. The time interval may be the difference in time between the second time stamp and the first time stamp. The data processing system may then compare the time interval with a time interval threshold (or threshold) to determine whether the time interval satisfies the threshold. The time interval may satisfy the threshold if the time interval is less than or equal to the time threshold. The time threshold may be, e.g., 2 hours, 3 hours, 30 minutes, 4 hours, 12 hours, 24 hours, 48 hours, a week, etc. A content provider may set, establish or otherwise assign the time threshold for a content campaign or content item. In some cases, the threshold may be predetermined by the data processing system 120.

If the time interval between when the user selects the content item and the data processing system receives the call is less than or equal to the threshold, the data processing system may then provide the tracking data for display using an in-band or out-of-band technique. However, if the time interval is greater than the time threshold, the data processing system may determine not to provide the tracking data. For example, the tracking data may no longer be relevant if the time interval between the content item selection and call is too large (e.g., greater than 72 hours).

The data processing system 120 may receive multiples calls from a same user and provide the tracking data to the content provider reach time. The data processing system 120 may further provide the tracking data responsive to a time interval satisfying a threshold. In the case where multiple calls are made to the same virtual number, the data processing system 120 may determine a time interval between a last event with the user and the time stamp of the call. A last event may refer to a previous call to the data processing system via the first virtual number, the time stamp of initiation or termination of the previous call, a selection of the content item, a conversion on the content item, etc. Thus, if the time interval for a subsequent call satisfies the time threshold, then the data processing system 120 can provide the tracking data to the content provider responsive to the time interval satisfying a threshold.

In some implementations, the data processing system 120 can remove tracking data posted to an electronic site based on a duration or time interval. For example, if a user selected the content item more 2 hours ago (or some other time interval), the data processing system 120 may remove any tracking that may have been posted to an electronic site controlled, managed or hosted by the data processing system 120, or may provide an instruction to an owner of manager of the electronic site to remove such tracking data.

In some cases, the data processing system may receive a call via the first virtual number and determine that the first virtual number is no longer linked to tracking data due to a time interval exceeding a threshold. The data processing system 120 may determine in these cases to provide an indication to the content provider that the time interval exceeded the threshold and there is no tracking data. In some cases, the data processing system 120 may determine to provide the last available/linked tracking data.

In some implementations, the data processing system 120 can provide tracking data (or portions thereof) to a call engine 150 of a content provider. In some implementations, the virtual number engine of the data processing system 120 can be configured with the functionality of the call engine 150. A call engine 150 may refer to an interactive voice response ("IVR") technology that can allow a computer to interact with humans through the use of voice and tones. However, in this case, the data processing system 120 can be configured to interact with the IVR technology of the content provider as opposed to the user. For example, the data processing system 120 receives the first call via the first virtual number from the user, performs a look up to identify the corresponding tracking data, and then conveys the tracking data to the content provider's IVR technology interface or call engine. The data processing system 120 or the content provider's call engine 150 may then process the tracking data to determine the appropriate customer service representative, and direct the call to the selected customer service representative.

For example, the content provider's call engine 150 (or a call engine of the data processing system) may be configured with a policy. The policy may include one or more parameters, rules or conditions. For example, the policy may indicate that if the tracking data includes a first keyword, then the call engine is to direct the call to a first customer service representative or a first pool of customer service representatives. Another type of policy may include a ranking or quality based policy. For example, the call engine may be configured to determine the first keyword of the tracking data, apply the policy to the first keyword to determine that the call is to be directed to a customer service representative who has a certain rating or meets or exceeds a certain rating (e.g., 3 star, 4 star, 5 star).

The rating may be based on historical feedback from users. For example, at the end of each call with a customer service representative, the call engine or content provider may provide a survey to the user asking them for feedback on the call. The call engine may store this feedback in a data repository of the content provider. The call engine may then access this data repository responsive to applying the policy to the tracking data to identify one or more customer service representatives that are candidates to receive the call. The call engine may further identify the customer service representative that is currently available or with the shortest queue or wait time.

Thus, the data processing system can provide tracking data in real-time to a content provider, which the content provider can then use to direct the call to the appropriate customer service representative and/or allow the selected customer service representative to provide a tailored or improved customer experience. In some implementations, the data processing system can provide the tracking data in an offline manner, such as responsive to a request from a content provider's device for tracking data. In an offline mode, the data processing system may receive the request for the tracking data from a content provider's device at some time after the tracking data is stored in a data structure or after a call is completed, where the request may include a virtual number that can be used to lookup the tracking data stored in the data structure. In some cases, the data processing system may generate an offline report with tracking data for a plurality calls associated with the virtual number, or a plurality of virtual numbers associated with a content group or content campaign.

In some cases, the data processing system 120 can configure the call to the content provider with a caller identification number. For example, the caller identification number provided to the content provider (or customer service representative's device) may include the first virtual number dialed by the user's computing device to initiate the first telecommunications channel with the data processing system 120, a number of the data processing system 120, or a number associated with the user's computing device. In some cases, the data processing system 120 can configure the caller identification number based on a policy or rules. If only the first virtual number of a pool of virtual numbers assigned to the content provider or the content campaign is currently allocated to a content item, then the data processing system may forward first virtual number as the caller identification to the content provider.

Figure 2:
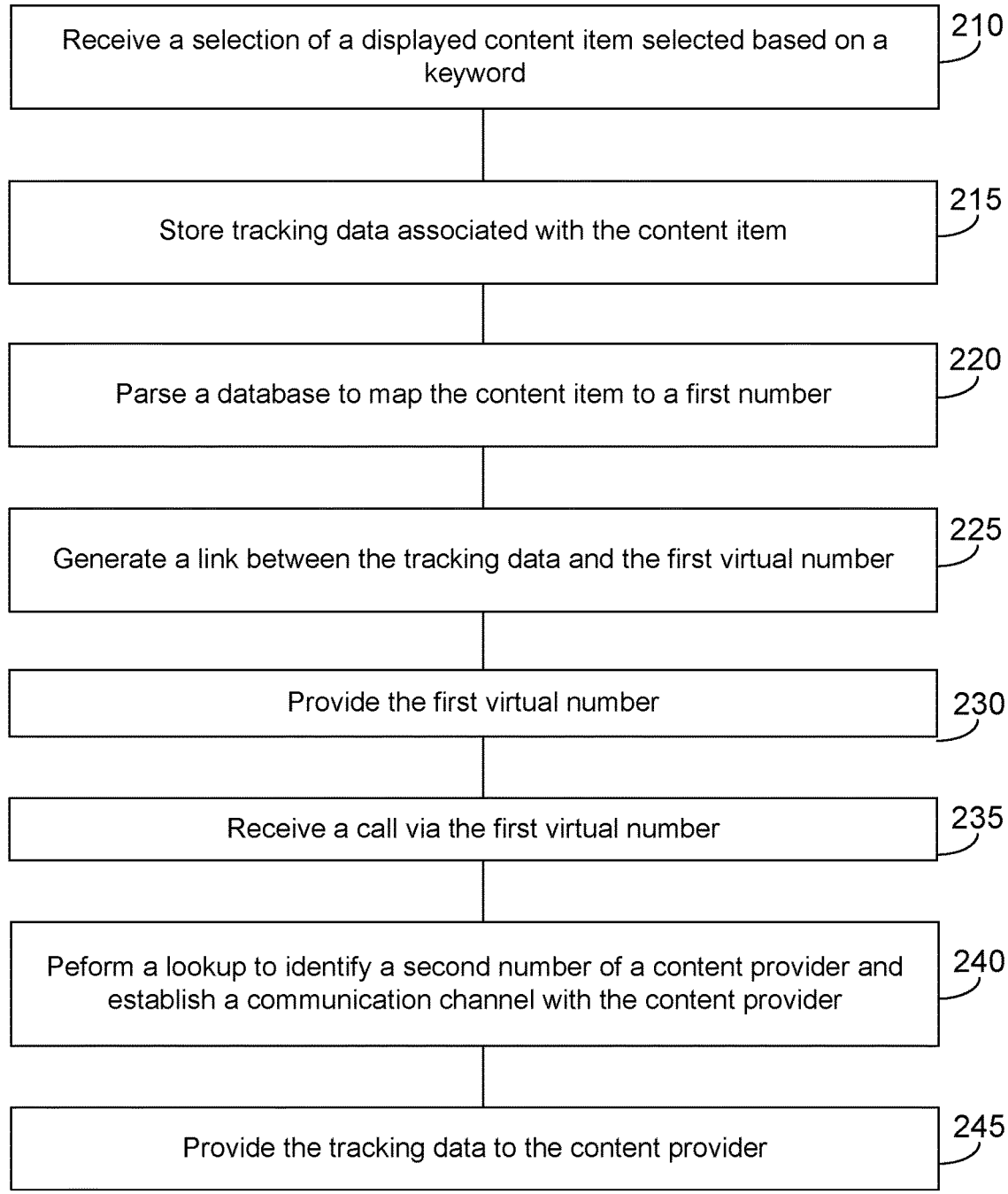
FIG. 2 is an illustration of a method of providing call context via a computer network in accordance with an implementation.

FIG. 2 shows an illustration of a method of providing call context via a computer network in accordance with an implementation. The method 200 can be performed via one or more system of component illustrated in FIG. 1 or FIG. 4, including, e.g., a data processing system, virtual number engine, tracker, content selector or data repository. In brief overview, and in some implementations, the method 200 includes a data processing system receiving a selection of a displayed content item selected based on a keyword of the content item at block 210. At block 215, the data processing system stores tracking data associated with the content item. At block 220, the data processing system parses a database to map the content item to a first number. At block 225, the data processing system generates a link between the tracking data and the first virtual number. At block 230, the data processing system provides the first virtual number. At block 235, the data processing system receives a call via the first virtual number. At block 240, the data processing system performs a lookup to identify a second number of a content provider, and establishes a communication channel with the content provider. At block 245, the data processing system provides the tracking data to the content provider.

In further detail, the method 200 includes a data processing system receiving a selection of a displayed content item selected based on a keyword of the content item at block 210. In some implementations, the data processing system provides the content item for display with a web page. In some implementations, a content selector executed by a processor of a data processing system provides the content item for display with a webpage. The content selector may select the content item based on content selection criteria. The content item may include content selection criteria provided by the content provider when setting up a content campaign for the content item. The data processing system may access a database storing the content items and corresponding content selection criteria to select the content item. For example, the data processing system may determine that a keyword of the content item matches a search query associated with the web page or other content of the web page, and select the content item based on the matching keyword. The content item may include an advertisement, online document, electronic content item, image, video, multimedia content item. The content item may be or include a call content item that is associated with a phone number.

At block 210, the data processing system (e.g., via a tracker) receives a selection of the content item. For example, the content item may be displayed via a display device of a user's computing device. The user may interact with the content item using an input device such as a mouse, keyboard or touch surface. Responsive to the selection, the data processing system can store tracking data associated with the content item at block 215. The tracking data can include a keyword of the content item, such as the keyword that was used to select the content item. In some cases, the data processing system can store the tracking data in an impression data structure. The impression data structure may include a record for each impression, where the record may include tracking data such as the keyword, whether the impression resulted in a selection of the content item, whether the impression resulted in a conversion, a time stamp of the impression, etc.

At block 220, the data processing system parses a database to map the content item to a first number. The data processing system can parse the database storing a mapping of content items to virtual numbers to map the selected content item to a first virtual number. The data processing system may parse the data responsive to the selection of the content item. The data processing may perform a lookup in a database using a content item identifier to identify the first number. The first number may refer to a virtual number.

At block 225, the data processing system generates a link between the tracking data and the first number. For example, the data processing system can generate a link between the tracking data stored in the impression data structure and the first virtual number stored in the database. In some implementations, the link may refer to a pointer in one data structure to a record, entry or value in another data structure. In some implementations, the link may refer to creating a new data structure that combines or associates the tracking data with the first number.

At block 230, the data processing system provides the first number. The data processing system may provide the first number responsive to the selection. The data processing system may transmit or otherwise provide the first virtual number for display on the webpage with the content item responsive to receiving the selection of the content item. The data processing system may provide the first number by transmitting data packets including a payload with the first number to a user's computing device, where the data packets include instructions that cause the browser of the user's computing device to display the number. In some implementations, the data processing system may provide a link or button for display on the computing device that, when selected, causes the computing device to initiate a call to the first number. Thus, in some cases, the first number may not be displayed on the computing device and in some implementations the first number may be displayed on the computing device.

At block 235, the data processing system receives a call via the first virtual number. The data processing system may receive a call to initiate a first communication channel via the first number. The call may be received via the user's computing device that displayed the content item, or another computing device.

At block 240, the data processing system performs a lookup to identify a second number of a content provider, and establishes a communication channel with the content provider. The data processing system can perform the lookup responsive to the call. The data processing system can perform a lookup in the database using the first virtual number to identify a second virtual number corresponding to the content provider. The data processing system may further identify the tracking data linked with the first virtual number. In some implementations, the data processing system may perform a first lookup in a first database to identify the second number, and perform a second lookup in a second database to identify the linked tracking data. The data processing system may use the first virtual number to perform both lookups. The two lookups may be performed simultaneously, in parallel, or sequentially.

Upon identifying the second number, the data processing system can establish a second communication channel between the client device and the content provider device using the second number. In some cases, the data processing system may initiate a third, separate communication channel between the data processing system and the content provider using the second number, and then merge this third communication channel with the first communication channel between the user device and the data processing system to create the second communication channel between the user device and the content provider.

At block 245, the data processing system provides the tracking data to the content provider. The data processing system can provide the tracking data to the content provider via the second communication channel. For example, the data processing system may provide an indicator via the second communication channel that includes a caller identification or other identifier that indicates to the content provider how or where to access the tracking data. The data processing system can provide the tracking data to the content provider using in-band and/or out-of-band techniques. For example, the data processing system can provide the tracking data at the beginning of the communication channel with the content provider using an audio message, text to speech technology, audio tone that signals a device to interpret the tone (e.g., using telecopying or telefax technology or other audio-frequency tones to convey information about tracking data) via the communication channel. In another example, the data processing system can use an out-of-band technology to identify an electronic site associated with the content provider, and provide the tracking data for display on the electronic site. For example, the data processing system may perform a lookup in a database that includes a mapping of the first virtual number or the second virtual number to an electronic site identifier. The electronic site may be a website that is accessible by both the data processing system and a device of the content provider or customer service representative of the content provider. The electronic site may be a dynamic website or include portions that the data processing system can be configured to modify, update or otherwise manipulate to include tracking data. For example, the data processing system may use a java script program to generate portions of the electronic site to display tracking data.

In some implementations, the data processing can remove tracking data that has been provided on the electronic site. For example, the displayed tracking data can be associated with an expiration value (e.g., 2 hours, 4 hours, 6 hours, 24 hours, etc.). The data processing system may remove the tracking data responsive to expiration of a counter associated with the expiration value. In some cases, the data processing system can remove the previous tracking data responsive to the first virtual number being recycled for association with new tracking data.

The data processing system can be further configured to interface or communicate with a call engine of the content provider to facilitate directing the call to an appropriate customer service representative's device based on the tracking data associated with the content item displayed on the web page. For example, the data processing system may transmit the tracking data to the call engine, and the call engine may apply a policy to the tracking data to identify an appropriate customer service representative. The policy may be quality based, ranking based, priority based, time based, etc. For example, if the keyword used to select the advertisement was luxury cars, then the policy may instruct the call engine to direct the call to a customer service representative that has a high quality rating or feedback score, a customer service representative that specializes or has other expertise or training in luxury cars, or a customer service representative that is currently available. The call engine may access a database storing the customer service representatives' credentials and ratings to identify the representative. In some implementations, the data processing system may include the call engine and may further identify the second number of the content provider based on the policy.

FIG. 3 is a block diagram of a user interface 300 that facilitates providing call context via a computer network in accordance with an implementation. The user interface 300 may include a page displayed by an application executing on a computing device, such as a web page rendered by a web browser. The web page may be an interface for a search engine 305, and include a search query input box 310. Responsive to the search query 310, the search engine 305 provides search results 325. The data processing system (e.g., via content selector) can further provide a content item 315, such as an advertisement for a taxi service. The content item 315 may include a sponsored link included by the search engine (or content selector) in the search results. The content item 315 may include a link or button to click for a phone number 320, as well as a web address to a target or landing web page. The user may click the phone link 320, which may facilitate providing tracking data, and the data processing system may, responsive to receiving the selection, provide the phone number 330. The phone number 330 may be a pop up window, replace the link 320, be displayed adjacent to the content item, and be sent to the user device via a notification, alert, SMS text message or email.

Figure 4:
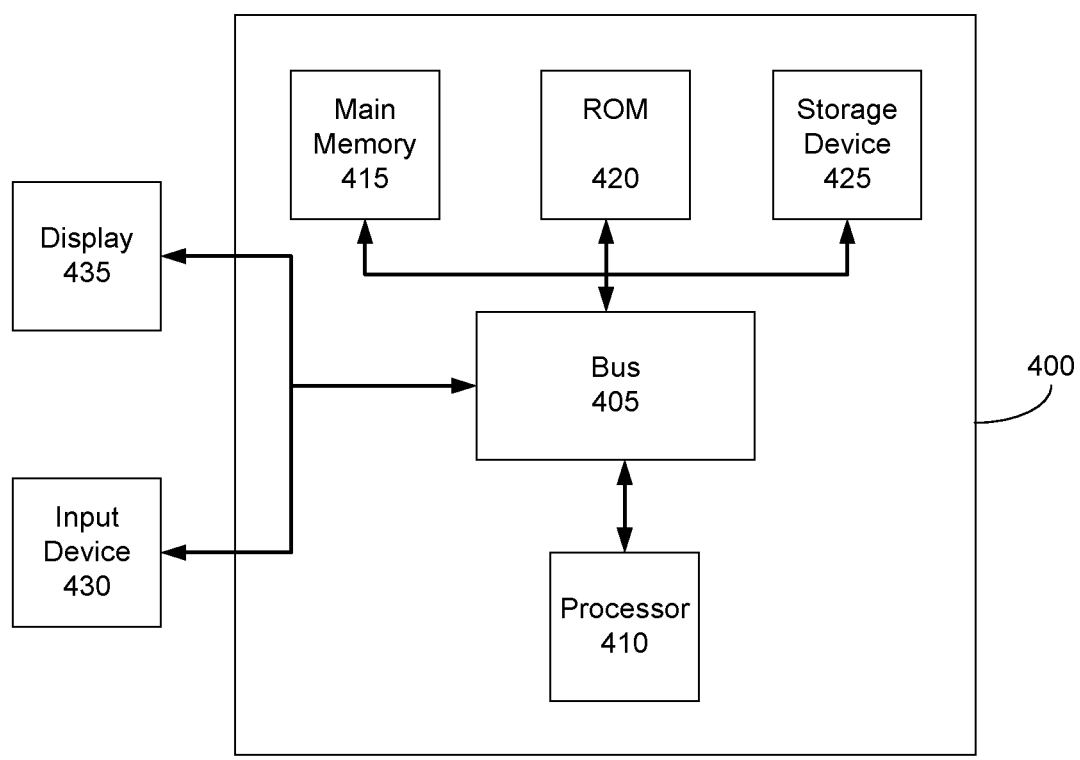
FIG. 4 is a block diagram illustrating a general architecture for a computer system that may be employed to implement various elements of the system shown in FIG. 1 and the method shown in FIG. 2, among others, in accordance with an implementation.

FIG. 4 is a block diagram of a computer system 400 in accordance with an illustrative implementation. The computer system or computing device 400 can be used to implement the system 100, system 300, content provider 125, computing device 110, content publisher 115, data processing system 120, virtual number engine 130, tracker 135, content selector 140 and data repository 145. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing call context via a computer network, comprising:
receiving, by a data processing system, a call from a client device to initiate a first communication channel via a first virtual number provided by the data processing system via a webpage, the call associated with a first time stamp;
performing, by the data processing system responsive to the call, a lookup in a database using the first virtual number to identify a second virtual number corresponding to a content provider that provided a content item with which the client device interacted at a second time stamp, the first virtual number linked with data including at least one of a keyword used, by the data processing system, to select the content item for presentation via the client device, a network source, and a term associated with a search query-used by the data processing system to select the content item;
establishing, by the data processing system via the second virtual number, a second communication channel between the client device and a content provider device, the second communication channel comprising at least one of a voice call or a video call;

determining, by the data processing system, a time interval between the first time stamp and the second time stamp;

associating, by the data processing system responsive to the time interval satisfying a threshold, the data with the second virtual number used to establish the second communication channel between the client device and the content provider device; and providing, by the data processing system responsive to the time interval satisfying the threshold, the data to the content provider via the second communication channel for provision during the second communication channel.

2. The method of claim 1, further comprising providing, by the data processing system, the first virtual number for display on the webpage with the content item responsive to receiving an indication of the interaction with the content item.

3. The method of claim 1, further comprising removing, by the data processing system, the data from the database responsive to a second time interval.

4. The method of claim 1, further comprising receiving, by the data processing system via the computer network, a selection of the content item, the selection associated with the second time stamp.

5. The method of claim 1, further comprising storing, in the database responsive to the interaction with the content item, the data including the at least one of the keyword of the selected content item, the network source, and the term associated with the search query used by the data processing system to select the content item.

6. The method of claim 1, further comprising identifying, by the data processing system responsive to the interaction with the content item, the first virtual number mapped to the content item from the database storing a mapping of content items to virtual numbers.

7. The method of claim 1, further comprising generating, by the data processing system, a link between the data stored in the database and the first virtual number.

8. The method of claim 1, further comprising:
initiating, by the data processing system, a third communication channel with the content provider device responsive to receiving the call from the client device to initiate the first communication channel; and
establishing, by the data processing system, the second communication channel by merging the first communication channel with the third communication channel.

9. The method of claim 1, further comprising providing, subsequent to the interaction with the content item by the client device, the data to the content provider via a second website.

10. The method of claim 1, further comprising providing, subsequent to the interaction with the content item by the client device, the data to the content provider via an electronic message.

11. A system for providing call context via a computer network, comprising:
a data processing system comprising at least one processor, the data processing system configured to:
receive a call from a client device to initiate a first communication channel via a first virtual number provided by the data processing system via a webpage, the call associated with a first time stamp;
perform, responsive to the call, a lookup in a database using the first virtual number to identify a second virtual number corresponding to a content provider that provided a content item with which the client device interacted at a second time stamp, the first virtual number linked with data including at least one of a keyword used, by the data processing system, to select the content item for presentation via the client device, a network source, and a term associated with a search query used by the data processing system to select the content item;
establish, via the second virtual number, a second communication channel between the client device and a content provider device, the second communication channel comprising at least one of a voice call or a video call;
determine a time interval between the first time stamp and the second time stamp;
associate, responsive to the time interval satisfying a threshold, the data with the second virtual number used to establish the second communication channel between the client device and the content provider device; and
provide, responsive to the time interval satisfying the threshold, the data to the content provider via the second communication channel for provision during the second communication channel.

12. The system of claim 11, wherein the data processing system is further configured to provide the first virtual number for display on the webpage with the content item responsive to receiving an indication of the interaction with the content item.

13. The system of claim 11, wherein the data processing system is further configured to remove the data from the database responsive to a second time interval.

14. The system of claim 11, wherein the data processing system is further configured to receive, via the computer network, a selection of the content item, the selection associated with the second time stamp.

15. The system of claim 11, wherein the data processing system is further configured to store, in the database responsive to the interaction with the content item, the data including the at least one of the keyword of the selected content item, the network source, and the term associated with the search query used by the data processing system to select the content item.

16. The system of claim 11, wherein the data processing system is further configured to identify, responsive to the interaction with the content item, the first virtual number mapped to the content item from the database storing a mapping of content items to virtual numbers.

17. The system of claim 11, wherein the data processing system is further configured to generate a link between the data stored in the database and the first virtual number.

18. The system of claim 11, wherein the data processing system is further configured to:
initiate a third communication channel with the content provider device responsive to receiving the call from the client device to initiate the first communication channel; and
establish the second communication channel by merging the first communication channel with the third communication channel.

19. The system of claim 11, wherein the data processing system is further configured to provide, subsequent to the interaction with the content item by the client device, the data to the content provider via a second website.

20. The system of claim 11, wherein the data processing system is further configured to provide, subsequent to the interaction with the content item by the client device, the data to the content provider via an electronic message.

* * * * *